Patented July 27, 1954

2,684,966

UNITED STATES PATENT OFFICE 2,684,966

TRIAZOLE DYESTUFFS

Ernst Keller and Reinhard Zweidler, Basel, Switzerland, assignors to J. R. Geigy A. G., Basel, Switzerland No Drawing. Application January 21, 1953,
Serial No. 332,500

Claims priority, application Switzerland
January 21, 1952

6 Claims. (Cl. 260—308)

The present invention concerns the production of new dyestuffs, the direct dyeings of which on cellulose fibres fluoresce to a greater or lesser degree in ultraviolet light according to the composition thereof. It is due to this property that they produce a luminous effect which has never before been attained.

It has been found that by coupling tetrazotised 1.4-di-(4'-aminostyryl)-benzene compounds with aromatic amino compounds coupling in the o-position to an amino group, dis-o-aminoazo dyestuffs can be obtained which can be oxidised by methods known per se to form the corresponding 1.4-di-[4'-(arylo-1.2.3-triazolyl-2)-styryl]-benzene compounds of the general formula:

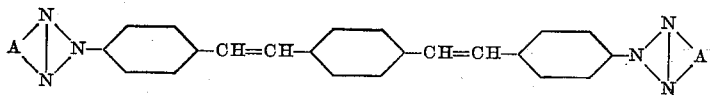

In this formula A represents an aromatic radical bound by neighbouring carbon atoms to the nitrogen atoms of the 1.2.3-triazole ring. All the aromatic radicals of these triazole compounds can be further substituted as desired, e. g. by halogen, alkyl, alkoxy, amino, acylamino, carboxyl and sulphonic acid groups.

Insofar as they contain no further chromophores, such as e. g. arylazo groups, these new 1.4-di-(4'-arylotriazolyl-styryl)-benzene compounds are yellow dyestuffs, the dyeings of which in ultraviolet light fluoresce more or less intensively according to the composition of the light and the substrata and, therefore, in daylight they produce shades of pure luminosity which have hitherto never been attained. This is true particularly of the direct dyeings on cellulose.

The most suitable compound for the production of textile dyestuffs according to the process of the present invention is the 1.4-di-(4'-amino-2'-sulphonic acid - styryl) - benzene compound. This compound is obtained according to the process of the patent specification Ser. No. 214,014, now U. S. Patent No. 2,657,228 granted October 27, 1953, by condensing terephthalaldehyde with 5-nitro-2-methylbenzene-1-sulphonic acid aryl esters, saponifying the sulphonic acid aryl ester and reducing the nitro group to the amino group. The aqueous solution of its alkali salts can easily be tetrazotised according to the indirect method with sodium nitrite and mineral acid and coupled in a neutral to weakly acid medium with aromatic amino compounds coupling in the o-position to the amino group to form the dis-o-aminoazo dyestuff.

As aromatic amino compounds coupling in the o-position to an amino group, preferably those of the benzene and naphthalene series are employed in the process according to the present invention, e. g. 1.3-diaminobenzene, 1.3-diamino-4-methyl- or -4-chlorobenzene, 1.3-diaminobenzene-4-sulphonic acid, 5-chloro-1-aminonaphthalene, 1-aminonaphthalene-4- or -5-sulphonic acid, 2-aminonaphthalene, 2-amino-6-methoxynaphthalene, 2-amino-naphthalene-5-, -6- or -7-monosulphonic acid, 2-aminonaphthalene-3.6- or -5.7-disulphonic acids, etc. It is also possible, however, to use heterocyclic aromatic amino compounds coupling in the o-position to an amino group, e. g. 2-phenyl-5-amino-1.2.3-benztriazole and similar compounds.

The dis-o-aminoazo dyestuffs are oxidised to form the corresponding arylo-1.2.3-triazolyl compounds by methods known per se, for example in aqueous solution or suspension or in organic solvents which are stable to oxidation. As oxidation agents can be used for example the cupritetrammine salts and the salts of hypochlorous acid. It is often advantageous to reduce the oxidation products afterwards, for example to react them with sodium hydrosulphite in order to convert any 1.2.3-triazole oxide into 1.2.3-triazole compounds. Also, any functional groups present in the end products can be altered afterwards, e. g. amino groups by acylation, insofar as this is desired and it is advantageous to do so.

As already mentioned, it is advantageous for textile purposes to use 1.4-di-(4'-aminostyryl)-benzene-2'.2'-disulphonic acid, the tetrazo compound of which can be coupled advantageously with such azo components as contain acid water-solubilising groups, such as carboxyl or sulphonic acid groups. Particularly favourable azo components for the production of water soluble dyestuffs having an affinity to cellulose fibres according to the present invention are the aminonaphthalene sulphonic acids coupling in the o-position to the amino group, and of these, particularly 2-aminonaphthalene - 5.7 - disulphonic acid, because it produces the most pure dyestuffs according to this invention.

The new 1.4-di-[4'-(arylo-1.2.3-triazolyl-2)-styryl]-benzene compounds are yellow powders and, insofar as they contain acid water-solubilising groups, in the form of their alkali salts they dissolve in water with a yellow colour. They have a marked affinity, varying according to the composition, to cellulose fibres.

The following examples illustrate the invention without limiting it in any way. Where not otherwise stated, parts are given as parts by weight and the temperatures are in degrees centigrade. The relationship of parts by volume to parts by weight is as that of kilogrammes to litres.

*Example 1*

47.2 parts of 1.4-di-(4'-aminostyryl)-benzene-2'.2'-disulphonic acid are dissolved with sodium hydroxide in 1400 parts of hot water. The solution should have a neutral reaction. An aqueous solution of 13.8 parts of sodium nitrite is then added and the whole is indirectly diazotised at 10–12° with 50 parts of concentrated hydrochloric acid. The whole is stirred for half an hour and then the suspension of the tetrazo compound is added at 10–12° to a solution of 44.6 parts of 2-aminonaphthalene-6-sulphonic acid which has been dissolved in 500 parts of water with 8.2 parts of sodium hydroxide and 50 parts of crystallised sodium acetate. On completion of the coupling, the dyestuff is completely precipitated by the addition of sodium chloride and filtered off. The damp dyestuff is then completely dissolved in water with the addition of 40 parts of 25% ammonia and a solution of 120 parts of crystallised copper sulphate in 480 parts of water to which 240 parts of 25% ammonia has been added is added at 92–97°. The whole is kept for several hours at 92–97° until the azo dyestuff has completely disappeared. It is then allowed to cool and the ditriazolyl compound is salted out by the addition of sodium chloride. The raw product in the presence of an excess of sodium sulphide is dissolved in hot water, the copper sulphide which forms is filtered off, the excess alkali sulphide compound is decomposed with hydrochloric acid, and the product is further purified by recrystallisation from water with the addition of a little sodium hydrosulphite and animal charcoal. The sodium salt of 1.4-di-[4'-(naphtho-1''.2'':4.5-1.2.3-triazolyl-2) - styryl] - benzene - 2'.2'.6''.6''-tetrasulphonic acid of the formula:

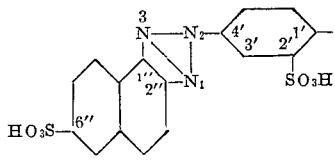

is obtained as a brownish yellow substance.

Dyed on to cellulose fibres, in daylight this compound produces a hitherto unobtained luminous yellow shade. In ultraviolet light fibres dyed therewith luminesce a brilliant yellow. The fastness properties of the dyeings on cellulose are good. Also, wool and silk can be dyed in a weakly acid bath; the dyeings obtained have pure shades and fluoresce very strongly in ultraviolet light.

If in the above example, the 2-aminonaphthalene-6-sulphonic acid is replaced by 44.6 parts of 2-aminonaphthalene-5-sulphonic acid, the sodium salt of 1.4-di-[4'-(naphtho-1''.2'':4.5-1.2.3-triazolyl-2) - styryl] - benzene - 2'.2'.5''.5''-tetrasulphonic acid is obtained as a yellow-brownish powder. The cellulose dyeing of this compound is a more greenish yellow shade and has the same interesting properties as the product described above.

*Example 2*

The tetrazo suspension prepared according to Example 1 from 47.2 parts of 1.4-di-(4'-aminostyryl)-benzene-2'.2'-disulphonic acid is added at 10–12° to a solution of 60.6 parts of 2-aminonaphthalene-5.7-disulphonic acid, 16.4 parts of sodium hydroxide and 50 parts of crystallised sodium acetate in 400 parts of water. On completion of the coupling, the dyestuff is completely precipitated by the addition of sodium chloride and filtered off. The damp dyestuff is then completely dissolved in hot water with the addition of 40 parts of 25% ammonia and is oxidised at 92–97° to form the ditriazolyl compound with a mixture of 120 parts of crystallised copper sulphate in 480 parts of water and 240 parts of 25% ammonia. The copper is removed from the product as described in Example 1 with sodium sulphide. The product is purified whereupon the sodium salt of 1.4-di-[4'-(naphtho-1''.2'':4.5-1.2.3 - triazolyl - 2) - styryl] - benzene-2'.2'.5''.5''.7''.7''-hexasulphonic acid of the formula:

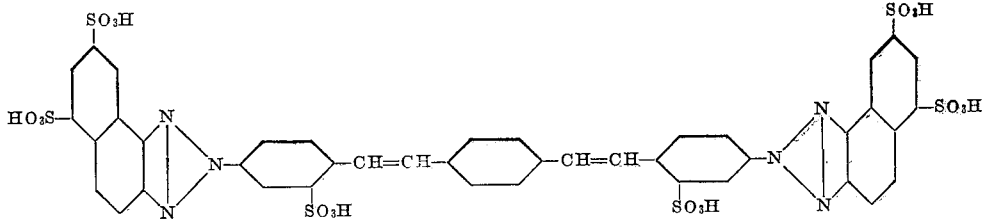

is obtained as a yellow-brown powder. The compound is easily soluble in water, the solutions are a pure yellor colour. When dyed on to cellulose fibres, greenish-yellow dyeings are obtained of extraordinary purity and luminosity in daylight. The dyeings on cellulose have good fastness properties. In ultraviolet light they have a radiant greenish-yellow colour. The compound can also be dyed on to wool and silk from an acid bath, on which it produces very pure greenish-yellow dyeings.

If in the above example, the 2-aminonaphthalene-5.7-disulphonic acid is replaced by 60.6 parts of 2-aminonaphthalene-6.8-disulphonic acid, the sodium salt of 1.4-di-[4'-naphtho-1''.2'':4.5-1.2.3 - triazolyl - 2) - styryl] - benzene-2'.2'.6''.6''.8''.8''-hexasulphonic acid is obtained as a yellow-brown powder. Dyed on to cellulose, this compound produces a reddish yellow shade and the dyeing has interesting properties similar to the product described above.

*Example 3*

47.2 parts of 1.4-di-(4'-aminostyryl)-benzene-2'.2'-disulphonic acid are indirectly diazotised as described in Example 1 and the tetrazo compound is coupled with a solution of 21.7 parts of 1.3-diaminobenzene and 20 parts of concentrated hydrochloric acid in 400 parts of water. A solution of 77 parts of crystallised sodium acetate is slowly added dropwise at 10–12°. After the tetrazo compound has completely disappeared, the dyestuff is salted out and filtered off. The filter cake is dissolved in hot water with the addition of 40 parts of 25% ammonia and is oxidised at 92–97° with a mixture of 120 parts of crystallised copper

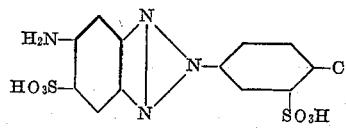

sulphate in 480 parts of water and 240 parts of 25% ammonia. The copper is removed from the ditriazolyl compound as described in Example 1 and the dyestuff is purified. The sodium salt of 1.4 - di - [4' - (5'' - aminobenzo - 1''.2'':4.5-1.2.3 - triazolyl - 2) - styryl] - benzene - 2'.2'-disulphonic acid of the formula:

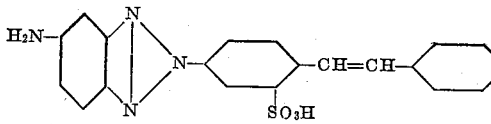

is obtained as a brownish-yellow powder. The aqueous solutions of the alkali salts are yellow coloured. When dyed on to cellulose fibres, an intense yellow dyeing is obtained which fluoresces strong yellow in ultraviolet light.

1.4 - di - [4' - (5'' - acetamino - benzo-1''.2'':4.5 - 1.2.3 - triazolyl - 2) - styryl] - benzene-2'.2'-disulphonic acid is obtained by acetylating the compound described above in the example. This compound, which otherwise has similar properties, produces a more greenish shade on cellulose fibres.

If in the above example, the m-phenylene diamine is replaced by 27.4 parts of 1-amino-4-methyl-3-methoxybenzene, the sodium salt of 1.4 - di - [4' - (4'' - methyl - 5'' - methoxy-benzo-1''.2'':4.5-1.2.3-triazolyl - 2) - styryl] - benzene-2'.2'-disulphonic acid of the formula:

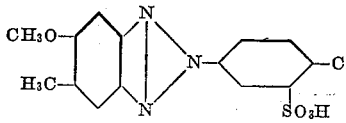

is obtained as a brownish yellow powder. When dyed on to cellulose fibres this compound also produces an intensive yellow dyeing which has properties similar to those of the product described above.

Example 4

A suspension of a tetrazo compound produced according to Example 1 from 47.2 parts of 1.4-di-(4'-aminostyryl)-benzene-2'.2'-disulphonic acid is added at 10–12° to a neutral solution of 37.6 parts of 1.3-diaminobenzene-4-sulphonic acid, 8.2 parts of sodium hydroxide and 50 parts of crystallised sodium acetate in 500 parts of water. On completion of the coupling, the dyestuff is salted out and filtered off. The damp dyestuff is dissolved in hot water with the addition of 40 parts of 24% ammonia and oxidised at 92–97° with a mixture of 120 parts of crystallised copper sulphate in 480 parts of water and 240 parts of 25% ammonia to form the ditriazolyl compound. The copper is removed with sodium sulphide and the product is purified as described in Example 1. The sodium salt of 1.4-di-[4'-(5''-aminobenzo-1''.2'':4.5 - 1.2.3 - triazolyl - 2) - styryl] - benzene-2'.2'.4''.4''-tetrasulphonic acid of the formula:

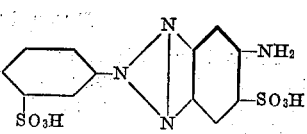

is obtained as a brownish yellow powder. The aqueous solutions of the alkali salts of this compound are pure yellow. A yellow dyeing with a very pure nuance is obtained on cellulose fibres. The solutions and dyeings of this product show a strong brilliant yellow luminescence in ultra-violet light.

If the compound described in the above example is acetylated, 1.4-di-[4'-(5''-acetaminobenzo-1''.2'':4.5 - 1.2.3 - triazolyl - 2) - styryl] - benzene-2'.2'.4''.4''-tetrasulphonic acid is obtained. The dyeings of this compound on cellulose fibres while having otherwise similar properties, are a more greenish yellow than those of the unacetylated product.

Example 5

47.2 parts of 1.4-di-(4'-aminostyryl)-benzene-2'.2'-disulphonic acid are indirectly diazotised as described in Example 1. A solution of 37.5 parts of 2.3-aminonaphthoic acid, 82 parts of sodium hydroxide and 50 parts of crystallised sodium acetate in 500 parts of water is added to the suspension of the tetrazo compound at a temperature of 10–12°. On completion of the coupling, the dyestuff is precipitated by the addition of sodium chloride and filtered off. The damp dyestuff is dissolved by the addition of 40 parts of 25% ammonia in hot water and oxidised at a temperature of 92–97° with a mixture of 120 parts of crystallised copper sulphate in 480 parts of water and 240 parts of 25% ammonia to form the ditriazolyl compound. The copper is removed by repeated boiling out with 3% hydrochloric acid, the dyestuff is pasted in excess 2% sodium carbonate solution and the sodium salt of 1.4-di-[4'-(naphtho - 1''.2'':4.5 - 1.2.3 - triazolyl - 2) - styryl]-benzene-3''.3''-dicarboxy-2'.2'-disulphonic acid of the formula:

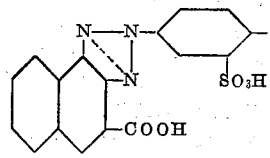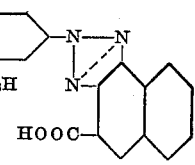

is obtained as a yellow-brown powder.

Dyed on to cellulose fibres, this compound produces a yellow shade which is luminous in daylight. In ultraviolet light, fibres dyed therewith shine a radiant yellow. The compound can also be dyed from an acid bath on to wool and silk and then produces very pure, greenish yellow dyeings.

*Example 6*

10 parts of cotton are treated for 60 minutes at 90° in a bath (liquor ratio 1:40) containing 2% (calculated on the weight of the fibres) of the sodium salt of 1.4-di-[4'-naphtho-1''.2'':4.5-1.2.3 - triazolyl - 2) - styryl] - benzene-2'.2'.5''.5''.7''.7''-hexasulphonic acid obtained according to Example 2, 50% of Glaubers salt and 1% of soda (calculated on the weight of the fibres). After rinsing and drying, in daylight the material has a brilliant greenish yellow colour of a purity which has hitherto never been attained.

What we claim is:

1. A triazole dyestuff having the general formula:

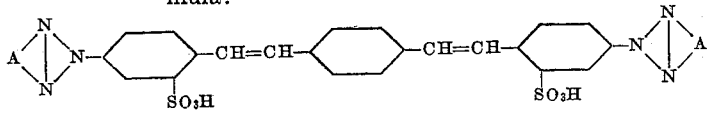

wherein A represents an aromatic radical selected from the group consisting of the benzene and naphthalene series bound by neighbouring carbon atoms to the nitrogen atoms of the 1.2.3-triazole ring.

2. A triazole dyestuff having the formula:

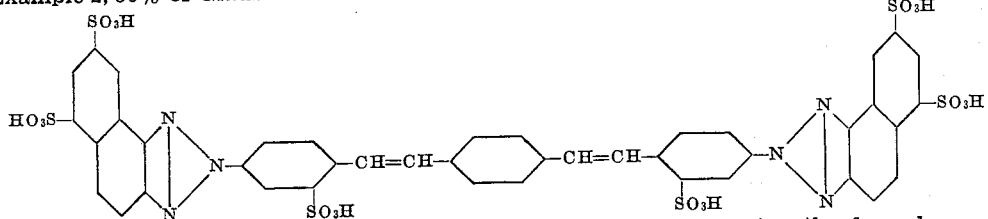

3. A triazole dyestuff having the formula:

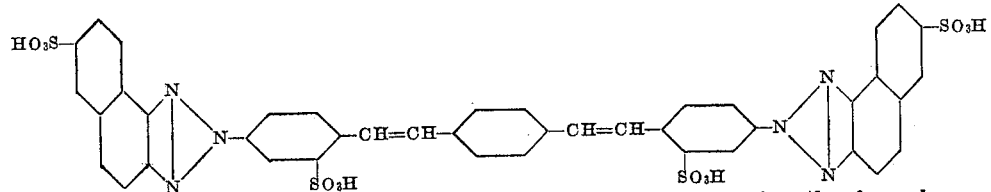

4. A triazole dyestuff having the formula:

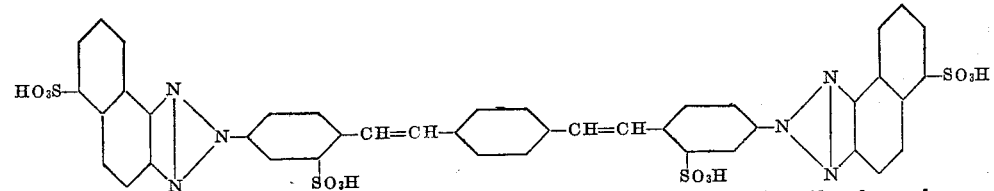

5. A triazole dyestuff having the formula:

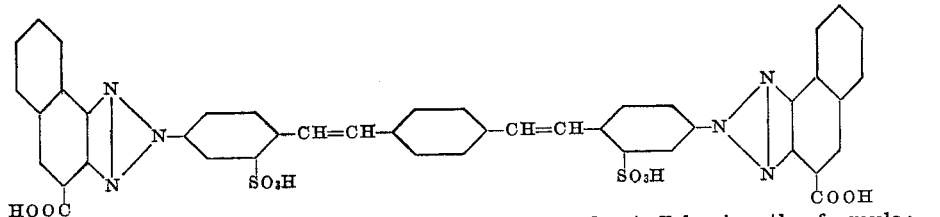

6. A triazole dyestuff having the formula:

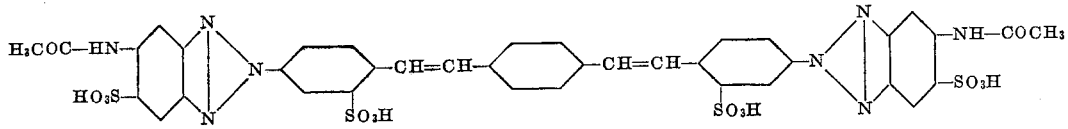

References Cited in the file of this patent

UNITED STATES PATENTS

| Number | Name | Date |
|---|---|---|
| 2,467,262 | Knight | Apr. 12, 1949 |

FOREIGN PATENTS

| Number | Country | Date |
|---|---|---|
| 590,426 | Great Britain | July 17, 1947 |
| 603,267 | Great Britain | June 11, 1948 |

OTHER REFERENCES

Charrier, Chem. Abstracts, vol. 24, page 366 (1930).